US008911544B2

(12) United States Patent
Chopra et al.

(10) Patent No.: US 8,911,544 B2
(45) Date of Patent: Dec. 16, 2014

(54) PHASE CHANGE INK COMPOSITION

(71) Applicant: Xerox Corporation, Norwalk, CT (US)

(72) Inventors: Naveen Chopra, Oakville (CA); Srinivasa Rangaraj Deshiikan, Wilsonville, OR (US); Daryl W. Vanbesien, Burlington (CA); Gabriel Iftime, Mississauga (CA); Daniel Mark Platt, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/847,116

(22) Filed: Mar. 19, 2013

(65) Prior Publication Data
US 2014/0287205 A1    Sep. 25, 2014

(51) Int. Cl.
C09D 11/02 (2014.01)
G01D 11/00 (2006.01)
C09D 11/322 (2014.01)
C09D 11/50 (2014.01)
C09D 11/34 (2014.01)

(52) U.S. Cl.
CPC .............. C09D 11/322 (2013.01); C09D 11/50 (2013.01); C09D 11/34 (2013.01)
USPC .................. 106/31.29; 106/31.61; 106/31.32; 106/31.64; 106/31.15; 347/99

(58) Field of Classification Search
CPC ................................. C09D 11/34; C09D 11/50
USPC ........... 106/31.29, 31.61, 31.32, 31.64, 31.15
See application file for complete search history.

(56) References Cited

U.S. PATENT DOCUMENTS

| 4,889,560 | A | 12/1989 | Jaeger et al. | |
| 4,889,761 | A | 12/1989 | Titterington et al. | |
| 5,195,430 | A | 3/1993 | Rise | |
| 5,221,335 | A | 6/1993 | Williams et al. | |
| 5,372,851 | A | 12/1994 | Titterington et al. | |
| 5,621,022 | A | 4/1997 | Jaeger et al. | |
| 6,517,619 | B1 * | 2/2003 | Nowak et al. | 106/31.32 |
| 7,973,186 | B1 | 7/2011 | Goredema et al. | |
| 8,287,632 | B1 | 10/2012 | Morimitsu et al. | |
| 8,372,189 | B2 | 2/2013 | Chopra et al. | |
| 2009/0038506 | A1 * | 2/2009 | Odell et al. | 106/31.13 |
| 2010/0071590 | A1 * | 3/2010 | Kazmaier et al. | 106/31.61 |
| 2012/0272865 | A1 * | 11/2012 | Morimitsu et al. | 106/31.61 |
| 2012/0274713 | A1 * | 11/2012 | Odell et al. | 347/99 |
| 2013/0284057 | A1 * | 10/2013 | Belelie et al. | 106/31.61 |

OTHER PUBLICATIONS

Chopra, et al., U.S. Appl. No. 13/456,619, filed Apr. 26, 2012, "Phase Change Ink Compositions Comprising Crystalline Diurethanes and Derivatives Thereof," not yet published, 37 pages.
Jennifer L.Belelie, et al., U.S. Appl. No. 13/456,805, filed Apr. 26, 2012, "Phase Change Inks Comprising Organic Pigments," not yet published, 41 pages.

(Continued)

*Primary Examiner* — Veronica F Faison
(74) *Attorney, Agent, or Firm* — Marylou J. Lavoie

(57) ABSTRACT

A phase change ink composition including an amorphous compound; a crystalline compound; an optional synergist; an optional dispersant; and a white colorant having a volume average particle size of from about 25 nanometers to less than 200 nanometers.

18 Claims, 2 Drawing Sheets

(56) References Cited

OTHER PUBLICATIONS

Morimitsu, et al. U.S. Appl. No. 13/456,916, filed Apr. 26, 2012, "Phase Change Ink Compositions Comprising Aromatic Ethers," not yet published, 40 pages.

Morimitsu et al., U.S. Appl. No. 13/457,221, filed Apr. 26, 2013, "Phase Change Inks Comprising Crystalline Amides," not yet published, 39 pages.

Morimitsu, et al. U.S. Appl. No. 13/457,323, filed Apr. 26, 2012, "Phase Change Ink Compositions Comprising Crystalline Sulfone Compounds and Derivatives Thereof," not yet published, 42 pages.

Toosi et al., U.S. Appl. No. 12/723,909, filed Dec. 21, 2013, "Phase Change Ink Composition and Process for Preparing Same," not yet published, 57 pages.

* cited by examiner

US 8,911,544 B2

PHASE CHANGE INK COMPOSITION

BACKGROUND

The present disclosure is generally related to phase change ink, particularly phase change ink including an amorphous compound; a crystalline compound; an optional synergist; an optional dispersant; and a white colorant having a volume average particle size of from about 25 nanometers to less than 200 nanometers.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black (CMYK), although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

In addition to the CMYK color set, there is a need for white phase change ink. White inks are highly desired for certain graphic and labeling applications and for packaging applications. They are most typically used on transparent and dark substrates to compliment or provide a background to text or graphics. White text on smoke colored plastic is particularly striking. White colorants are pigments, which can comprise a variety of materials, most typically titanium dioxide. A general description of titanium dioxide properties can be found, for example, in Kirk-Othmer Encyclopedia of Chemical Technology, 4$^{th}$ Ed., (John Wiley & Sons, NY), Vol. 24, pages 239-240, which is hereby incorporated by reference herein. Because white is produced by light scattering, a pigment having a volume average particle size of from about 200 to about 400 nanometers is generally selected to provide sufficient opacity. As the particle size in a dispersion decreases below this range, the dispersion selectively scatters blue light and appears bluish white. As the particle size decreases further, it will not scatter visible light and will become transparent. For example, smaller nanometer sized titanium dioxide pigments are known, but they are colorless. White pigments pose a particular challenge for formulating into ink jet inks owing to their very high density. $TiO_2$ has a specific gravity of about 4. One problem is that the white pigment tends to settle in molten ink. Recirculating print heads have been required to address the problem of white pigment settling in molten ink. A combination of dense dispersions, for example, from about 2 to about 4 grams of pigment per milliliter of pigment and dispersion, relatively large size, and high loadings of pigment make it particularly challenging to design a storage stable and jettable white curable solid ink.

While known compositions and processes are suitable for their intended purposes, a need remains for phase change white inks that are suitable for ink jet printing processes, such as piezoelectric ink jet processes and the like. In addition, a need remains for phase change white inks that are suitable for acoustic ink jet printing processes. Further, a need remains for improved digital ink jet phase change white inks that can provide excellent print quality on colored package substrates including colored cardboard or thick paper, particularly brown or other darker colors, that can provide the desirable esthetic appearance and appeal of white prints over dark substrates, that provide improved storage stability and low Newtonian viscosity. Further, a need remains for improved digital ink jet phase change white inks that can provide acceptable rub and scratch resistance, especially for packaging applications where package handling increases the possibility of rub and scratch damage. Further, a need remains for stable, robust white phase change ink that can be used with phase change ink jet print heads without requiring recirculating or other complex methods, that are resistant to settling in the molten state, and that are sufficiently opaque to provide adequate contrast of the printed image.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition including an amorphous compound; a crystalline compound; an optional synergist; an optional dispersant; and a white colorant having a volume average particle size of from about 25 nanometers to less than 200 nanometers.

Also described is a method for preparing a phase change ink composition comprising combining an amorphous compound; a crystalline compound; an optional synergist; an optional dispersant; and a white colorant having a volume average particle size of from about 25 nanometers to less than 200 nanometers, with optional stirring, optional homogenizing, and optional heating, to provide a phase change ink composition.

Also described is a process comprising (1) incorporating into an ink jet printing apparatus a phase change ink composition comprising an amorphous compound; a crystalline compound; an optional synergist; an optional dispersant; an optional fluorescent dye; and a white colorant having a volume average particle size of from about 25 nanometers to less than 200 nanometers; (2) melting the ink; and (3) causing droplets of the melted ink to be ejected in an imagewise pattern onto a substrate.

Further described is a coated substrate comprising a substrate and a phase change ink composition deposited thereover; wherein the phase change ink composition comprises an amorphous compound; a crystalline compound; an optional synergist; an optional dispersant; an optional fluorescent dye; and a white colorant having a volume average particle size of from about 25 nanometers to less than 200 nanometers.

Still further described is an ink jet printer stick or pellet containing a phase change ink composition comprising an amorphous compound; a crystalline compound; an optional synergist; an optional dispersant; an optional fluorescent dye; and a white colorant having a volume average particle size of from about 25 nanometers to less than 200 nanometers.

DETAILED DESCRIPTION

Figure 1:
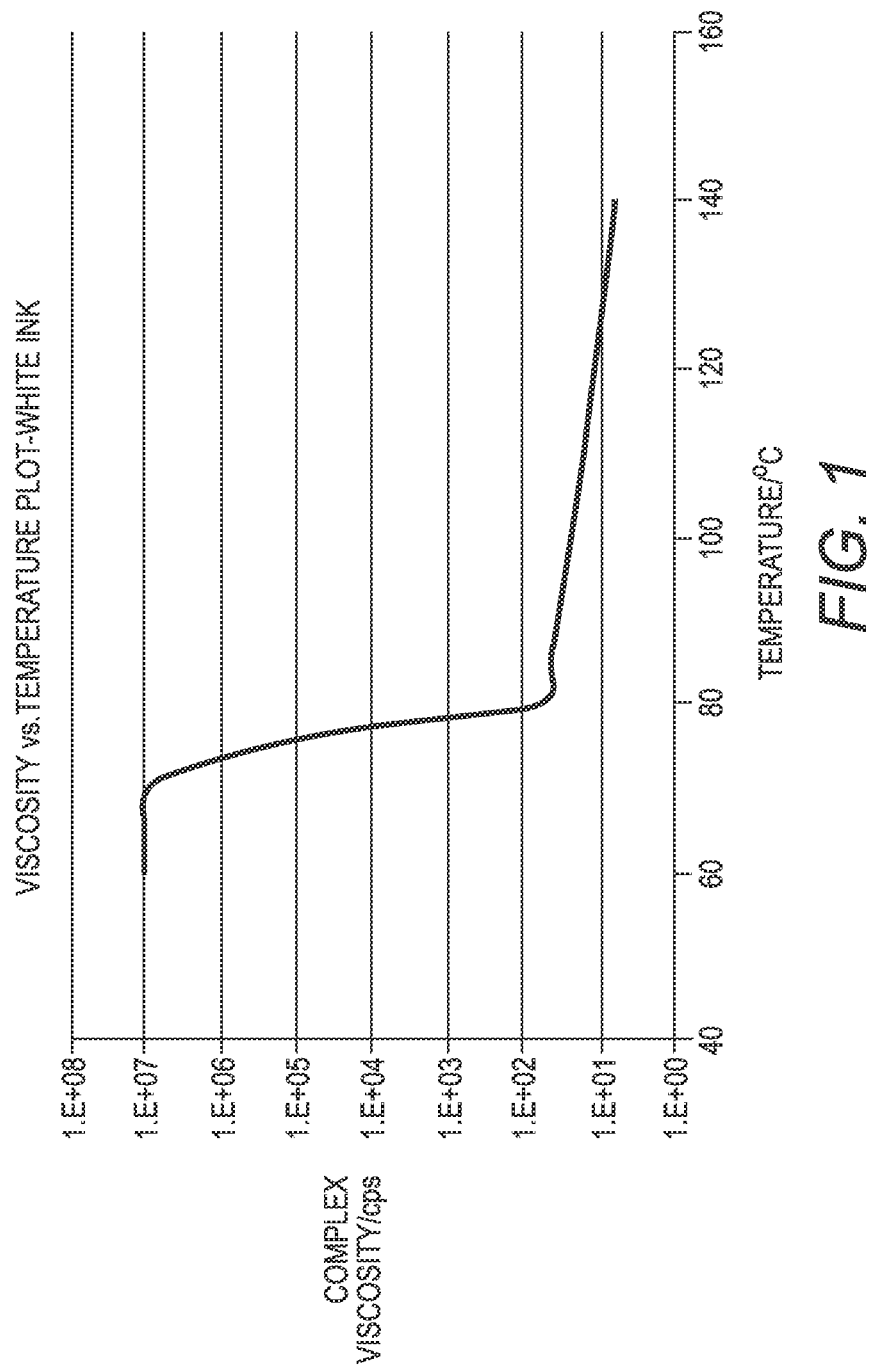
FIG. 1 is a graph showing complex viscosity (y-axis, centipoise) versus Temperature (x-axis, ° C.) for a phase change ink prepared in accordance with the present disclosure.

A white phase change ink composition is described comprising an amorphous compound; a crystalline compound; an optional synergist; an optional dispersant; and a white colorant having a volume average particle size of from about 25 nanometers to less than 200 nanometers. In embodiments, the white phase change ink is capable of being jetted using phase change ink jet print heads without requiring recirculating print heads, is resistant to settling in the molten state, and is sufficiently opaque so as to provide adequate contrast of the printed image prepared with the ink. In embodiments, the white phase change ink herein further provides improved scratch and fold resistance over commercially available phase change inks.

In embodiments, resistance to settling means that greater than 10% of the total pigment, or greater than 5% of the total pigment, remains in suspension. In further embodiments, resistance to settling in molten ink is demonstrated when filterability is maintained through a 5 micrometer screen.

In embodiments, adequate contrast when printed means having a contrast ratio of between 3:1 and 4:1, in particular in the visible region of the electromagnetic spectrum (300-600 nanometers), and is indicative of a suitable white ink.

Colorant.

Any desired or effective white colorant can be employed in the phase change white ink compositions herein, including dyes, pigments, mixtures thereof, and the like, provided that the colorant can be dissolved or dispersed in the ink vehicle.

In embodiments herein, the white colorant is a white pigment selected from titanium dioxide, zinc oxide, zinc sulfide, calcium carbonate, clay, lithopone (a mixture of barium sulphate and zinc sulfide), or mixtures or combinations thereof. In a specific embodiment, the white colorant is a titanium dioxide pigment. In a more specific embodiment, the white colorant is the form of $TiO_2$ known as rutile. Commercial grades of $TiO_2$ are designed with additional artifacts to enhance optical properties such as tint strength and undertone and to promote dispersion stability. The pigment features include size, degree of coating with silica and or alumina, as well as optional organic materials. Illustrative examples of suitable titanium oxide pigments include pigments selected from $TiO_2$ available from Sigma-Aldrich®, Ti-Pure® R-108, Ti-Pure® R-104, Ti-Pure® R-103, Ti-Pure® R-102, Ti-Pure® R-700, Ti-Pure® R-706, Ti-Pure® R-760, Ti-Pure® R-900, Ti-Pure® R-960, Ti-Pure® R-3910, available from DuPont Titanium Technologies, Wilmington, Del., 2020®, 2063®, 2090®, 2310®, 2450® available from Kronos Inc., Cranbury, N.J., and Tiona® 595, Tiona® 568, Tiona® RCL-6, Tiona® RCL-9, and Tiona® 696 available from Millennium Inorganic Chemicals, Hunt Valley, Md.

Previously, it was believed that a white colorant had to have a particle size of from about 200 to about 400 nanometers to provide sufficient opacity to a printed image. The present inventors have surprisingly found that a small particle size white colorant in combination with the phase change ink composition provided herein provides a robust, stable white phase change ink that is resistant to settling in the molten state, is opaque enough to provide adequate contrast of the printed image, and provides acceptable filterability.

In embodiments, pigments selected herein can have a volume average particle size (diameter) of from about 25 to less than about 200 nanometers, or from about 25 to about 100 nanometers, or from about 50 to about 100 nanometers. In a specific embodiment, the white colorant is a titanium dioxide pigment having a particle size of from about 25 to less than about 200 nanometers, or from about 25 to about 100 nanometers, or from about 50 to about 100 nanometers.

While not wishing to be bound by theory, it is believed that the smaller surface area of the present white colorant provides a white colorant that is less dense because of the smaller surface area, less prone to settling, while simultaneously unexpectedly providing a phase change ink that gives adequate contrast when printed. The smaller particles have adequate aggregation to give acceptable contrast. They are, in fact, providing a larger secondary particle size that is suitable for scattering light.

The characteristics of the phase change ink, as well as the white colorant, may be determined by any suitable technique and apparatus. Volume average particle diameter may be measured by means of a measuring instrument such as a Beckman Coulter Multisizer 3, operated in accordance with the manufacturer's instructions.

The white colorant is present in the ink in any desired or effective amount, in embodiments the white colorant is present in an amount of from about 1 to about 60 percent by weight based upon the total weight of the ink, or from about 20 to about 40 percent by weight based upon the total weight of the ink. In one embodiment, the white colorant is a titanium dioxide pigment present in the ink an amount of about 1 to about 60 percent by weight based upon the total weight of the ink, or from about 20 to about 40 percent by weight based upon the total weight of the ink, or from about 10 to about 20 percent based upon the total weight of the ink, or from about 12 to about 17 percent based upon the total weight of the ink, or about 10 percent by weight based upon the total weight of the ink.

Fluorescent Dye.

In embodiments, a white solid ink composition is provided herein, in embodiments which composition is especially suitable for security printing and packaging applications, although not limited. The phase change ink composition comprises an amorphous compound; a crystalline compound; an optional synergist; an optional dispersant; a white colorant having a volume average particle size of from about 25 nanometers to less than 200 nanometers, and a fluorescent dye. The performance of the phase change ink composition is unique because it has features including: (a) for prints made on colored substrates, the printed information changes color from white to a different color when seen under UV light; (b) for prints made with dark ink onto a white background prepared with the present phase change ink composition, the background changes color from white to a different color when exposed to UV light; and (c) coatings can be made with the present fluorescent white ink composition over a dark substrate onto which information is printed digitally.

The fluorescent dye can be any suitable or desired fluorescent dye. The fluorescent dye is typically a dye which is colorless in normal viewing light, for example in room ambient light or sunlight, and which emits bright light when viewed with ultra-violet (UV) light, although not limited. Examples of fluorescent dyes suitable for use herein include those belonging to the dye families known as rhodamines, fluorescein, coumarins, napthalimides, benzoxanthenes, acridines, azos, coordination complexes of rare earth metal ions, mixtures thereof and the like. Various invisible fluorescent dyes are commercially available. Other suitable fluorescent dyes include oil and solvent based dyes like DFSB class, DFPD class, DFSB-K class available from Risk Reactor of Huntington Beach, Calif. Other suppliers of fluorescent materials include Beaver Luminescers from Newton, Mass., and Cleveland Pigment & Color Co. form Akron, Ohio.

Suitable fluorescent dyes include, both colorless and colored dyes under normal viewing conditions and include for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightener 61, mixtures thereof and the like. Other suitable fluorescent dyes include oil and solvent based dyes like DFSB class, DFPD class, DFSB-K class available from Risk reactor of Huntington Beach, Calif. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, like for example PFC-03 which switches from invisible to red when exposed to UV light, PF class like for example PF-09 which switches from invisible to violet when exposed to UV light. Other suppliers of fluorescent materials include Beaver Luminescers from Newton, Mass. and Cleveland Pigment & Color Co. form Akron, Ohio. Non-limiting examples of fluorescent materials include 2-(2-hydroxybenzoxazol), 2,5-diphenyl-oxazole, DFKY-C7 (red emitting fluorescent rare earth metal coordination complex dye), DFSB K427 (emits orange color under ambient light and under exposure to UV light), 2-(2-hydroxyphenylbenzothoazole), and mixtures thereof.

In embodiments the present fluorescent phase change ink compositions include:

(a) limited (low or none) overlapping between the absorption spectra of the ink base and/or pigment on one side and the absorption spectrum of the fluorescent dye. This enables the activating UV light to reach the fluorescent dye dispersed in the ink composition. Otherwise the fluorescent is not activated or the intensity of light is diminished significantly, therefore resulting in poor ink detection performance.

(b) limited (low or none) overlapping between the emission spectra of the ink base/pigment package with the emission of the fluorescent dye.

(c) invisible fluorescent dye, that is, colorless under normal ambient viewing light when the objective is minimal or no change at all in the white color appearance.

In a specific embodiment, a security enabled phase change ink composition herein comprises an invisible fluorescent dye; an amorphous compound; a crystalline compound; an optional synergist; an optional dispersant; and a white colorant having a volume average particle size of from about 25 nanometers to less than 200 nanometers; wherein a printed image prepared with the phase change ink composition appears white under normal ambient conditions and wherein the printed image changes color when subjected to ultraviolet light.

Ink Carrier.

In embodiments, the phase change ink composition herein comprises an amorphous compound and a crystalline compound. A mixture of crystalline and amorphous small molecule compounds in solid ink formulations provides robust inks, and in particular, solid inks which demonstrate robust images on coated paper. See U.S. patent application Ser. No. 13/095,636 entitled "Solid Ink Compositions Comprising Crystalline-Amorphous Mixtures" of Jennifer L. Belelie et al., filed Apr. 27, 2011, which is hereby incorporated by reference herein in its entirety. Print samples made with such phase change inks demonstrate better robustness with respect to scratch, fold, and fold offset as compared to currently available phase change inks.

Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (about 140° C.).

It was further previously discovered that a robust solid ink can be obtained through a blend of crystalline and amorphous compounds. See U.S. patent application Ser. No. 13/456,805 entitled "Phase Change Inks Comprising Organic Pigments" of Jennifer L. Belelie et al., filed Apr. 26, 2012, which is hereby incorporated by reference herein in its entirety.

In embodiments, the present phase change ink compositions include a blend of (1) crystalline compounds and (2) amorphous compounds, in any suitable or desired amount, in embodiments, generally in a weight ratio of from about 60:40 to about 95:5, respectively. In more specific embodiments, the weight ratio of the crystalline to amorphous compound is from about 65:35 to about 95:5, or from about 70:30 to about 90:10, or from about 70:30 to about 80:20. In other embodiments, the crystalline and amorphous compounds are blended in a weight ratio of from about 1.5 to about 20, or from about 2.0 to about 10, respectively.

Each compound or component imparts specific properties to the solid inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

The Amorphous Compound.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

The alkyl group of the amorphous compound may have 1 to 40 carbon atoms (whenever it appears herein, a numerical range such as "1 to 40" refers to each integer in the given range; e.g., "1 to 40 carbon atoms" means that the alkyl group may consist of 1 carbon atom, 2 carbon atoms, 3 carbon atoms, etc., up to and including 40 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 4 carbon atoms. The alkyl group of the compounds herein may be designated as "C1-C5 alkyl" or similar designations. By way of example only, "C1-C4 alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. The alkyl group may be substituted or unsubstituted. When substituted, any group(s) besides hydrogen can be the substituent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are not limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "arylalkyl" as used herein, alone or in combination, refers to an aryl group attached to the parent molecular moiety through an alkyl group.

The Amorphous Compound.

In embodiments, the amorphous compound of the phase change inks herein comprises a first ester of tartaric acid of the formula

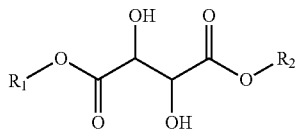

or a first ester of citric acid of the formula

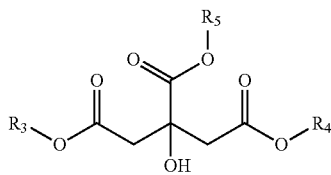

wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group. In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl. In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl.

In certain embodiments of the formula

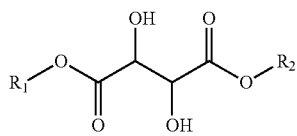

one of $R_1$ and $R_2$ is 2-isopropyl-5-methylcyclohexyl, and the other one of $R_1$ and $R_2$ is 2-isopropyl-5-methylcyclohexyl, 4-t-butylcyclohexyl, or cyclohexyl, or one of $R_1$ and $R_2$ is 4-t-butylcyclohexyl, and the other one of $R_1$ and $R_2$ is cyclohexyl. In certain embodiments, $R_1$ and $R_2$ are each 2-isopropyl-5-methylcyclohexyl. In certain embodiments, $R_1$ is 2-isopropyl-5-methylcyclohexyl and $R_2$ is 4-t-butylcyclohexyl. In certain other embodiments, $R_1$ is 2-isopropyl-5-methylcyclohexyl and $R_2$ is cyclohexyl. In still other embodiments, $R_1$ is 4-t-butylcyclohexyl and $R_2$ is cyclohexyl.

In certain embodiments of the formula

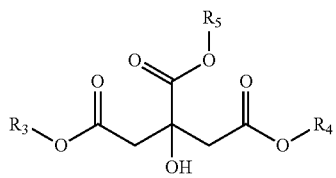

one of $R_3$, $R_4$ and $R_5$ is 2-isopropyl-5-methylcyclohexyl, and the other one of $R_3$, $R_4$ and $R_5$ is 2-isopropyl-5-methylcyclohexyl, 4-t-butylcyclohexyl, or cyclohexyl, or one of $R_3$, $R_4$ and $R_5$ is 4-t-butylcyclohexyl, and the other one of $R_3$, $R_4$ and $R_5$ is cyclohexyl. In certain embodiment, $R_3$, $R_4$ and $R_5$ are each 2-isopropyl-5-methylcyclohexyl. In certain embodiment, $R_3$ is 2-isopropyl-5-methylcyclohexyl and $R_4$ and $R_5$ are each 4-t-butylcyclohexyl. In certain embodiment, $R_3$ is 2-isopropyl-5-methylcyclohexyl and $R_4$ and $R_5$ are each cyclohexyl. In certain embodiment, $R_1$ is 4-t-butylcyclohexyl and $R_4$ and $R_5$ are each cyclohexyl.

In certain embodiment, the amorphous compound is selected from the group consisting of bis(2-isopropyl-5-methylcyclohexyl) L-tartrate or (4-t-butylcyclohexyl)(cyclohexyl)-L-tartrate, and stereoisomers and mixtures thereof.

Some suitable amorphous materials are disclosed in U.S. patent application Ser. No. 13/095,784 to Morimitsu et al., which is hereby incorporated by reference in its entirety. The amorphous materials may comprise an ester of tartaric acid of the formula

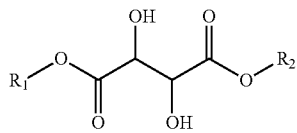

wherein $R_1$ and $R_2$ each, independently of the other, meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or an substituted or unsubstituted aromatic or heteroaromatic group. In certain embodiments, each $R_1$ and $R_2$ is independently a cyclohexyl group optionally substituted with one or more alkyl group(s) selected from methyl, ethyl, n-propyl, isopropyl, n-butyl and t-butyl. In certain embodiments, R1 and R2 are each 2-isopropyl-5-methylcyclohexyl.

The tartaric acid backbone can be selected from L-(+)-tartaric acid, 0-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

These materials show, relatively low viscosity (<102 centipoise (cps), or from about 1 to about 100 cps, or from about 5 to about 95 cps) near the jetting temperature (about 140° C., or from about 100 to about 140° C., or from about 105 to about 140° C.) but very high viscosity (>105 cps) at room temperature.

To synthesize the amorphous component, tartaric acid can be reacted with a variety of alcohols to make di-esters as shown in the synthesis scheme shown in U.S. patent application Ser. No. 13/095,784. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 40 carbon atoms, or a substituted or unsubstituted aromatic or heteroaromatic group, and mixtures thereof. A variety of alcohols may be used in the esterification such as, for example, menthol, isomenthol, neomenthol, isoneomenthol, and any stereoisomers and mixtures thereof. Mixtures of aliphatic alcohols may be used in the esterification. For example, a mixture of two aliphatic alcohols may be used in the esterification. The molar ratios of the aliphatic alcohols may be from 25:75 to 75:25, from 40:60 to 60:40, or about 50:50. Examples of suitable aliphatic alcohol whose mixtures form amorphous compounds when reacted with tartaric acid include cyclohexanol and substituted cyclohexanol (e.g., 2, 3 or 4-tert-butyl-cyclohexanol).

In embodiments, two or more molar equivalents of alcohol may be used in the reaction to produce the di-esters of tartaric acid. If one molar equivalent of alcohol is used, the result is mostly mono-esters.

Other suitable amorphous components for the phase change inks herein include those disclosed in U.S. patent application Ser. No. 13/095,795 to Morimitsu et al., which is hereby incorporated by reference in its entirety. The amorphous materials may comprise a compound of the formula

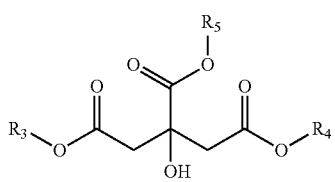

wherein $R_3$, $R_4$ and $R_5$ are independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof.

In embodiments, the amorphous compound is a compound of the formula

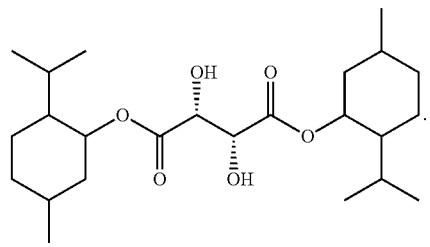 [SMILES: CC1CCC(C(C)C)C(OC(=O)[C@H](O)[C@@H](O)C(=O)OC2CC(C)CCC2C(C)C)C1]

These amorphous materials can be synthesized by an esterification reaction of citric acid. In particular, citric acid can be reacted with a variety of alcohols to make tri-esters according to the synthesis scheme disclosed therein. In embodiments, the phase change ink composition is obtained by using amorphous compounds synthesized from citric acid and at least one alcohol in an esterification reaction.

The amorphous compound can be present in any suitable or desired amount. In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound.

In embodiments, the phase change ink compositions herein include a crystalline compound comprising a second ester of tartaric acid of the formula

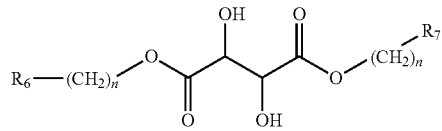

wherein each $R_6$ and $R_7$ is independently an aryl or a heteroaryl optionally substituted with a lower alkyl and alkoxy, each n is independently 0 to 3. In certain embodiments, each $R_6$ and $R_7$ is independently an optionally substituted aryl, such as a phenyl. In certain embodiments, each $R_6$ and $R_7$ is independently not substituted, or substituted with methyl, ethyl, isopropyl, methoxy or ethoxy. In certain embodiments, each $R_6$ and $R_7$ is independently a phenyl optionally substituted with methyl or methoxy.

In certain embodiments, each $R_6$ and $R_7$, independently is selected from the group consisting of

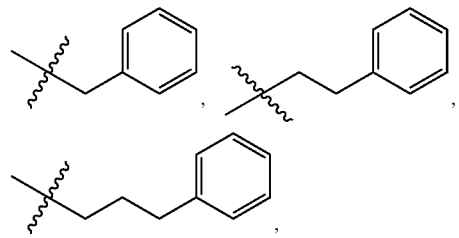

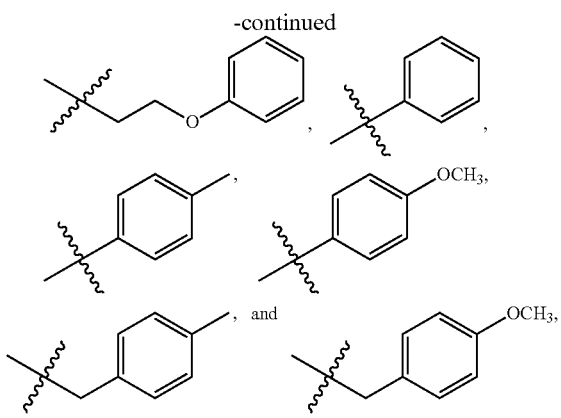

and mixtures thereof, wherein ～ represents the point of attachment of the $R_6$ and $R_7$ group to the compound.

In certain embodiments, the tartaric acid backbone is selected from L-(+)-tartaric acid, D-(−)-tartaric acid, DL-tartaric acid, or mesotartaric acid, and mixtures thereof.

In embodiments, the crystalline component may comprise amide, aromatic ester, linear diester, urethanes, sulfones, tartaric acid ester derivatives with aromatic groups, or mixtures thereof.

Suitable crystalline components include those disclosed in U.S. patent application Ser. No. 13/457,221 to Morimitsu et al., which is hereby incorporated by reference herein in its entirety. These crystalline materials comprise the following structure:

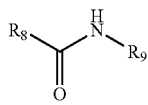

wherein $R_8$ and $R_9$ can be the same or different, each $R_8$ and $R_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, from about 6 to about 20 carbon atoms, or from about 6 to about 10 carbon atoms.

Suitable crystalline components also include those disclosed in U.S. patent application Ser. No. 13/456,916 to Morimitsu et al., which is hereby incorporated by reference herein in its entirety. These crystalline materials comprise the following structure:

$$R_{10}-O-[(CH_2)_2O]_p-R_{11}$$

wherein $R_{10}$ and $R_{11}$ can be the same or different, and wherein each $R_{10}$ and $R_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, or about 6 to about 20 carbon atoms, or from about 6 to about 10 carbon atoms, although the numbers can be outside of these ranges, and mixtures thereof, provided that at least one of $R_{10}$ and $R_{11}$ is an aromatic group; and p is 0 or 1.

Examples of crystalline aromatic ether include, but are not limited to,

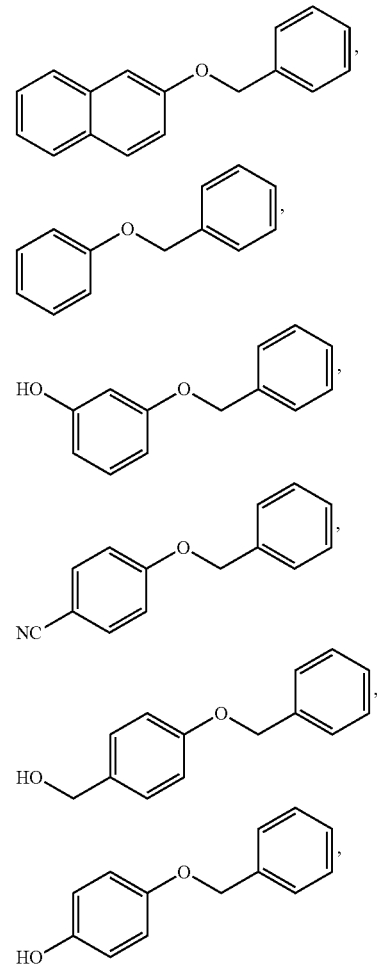

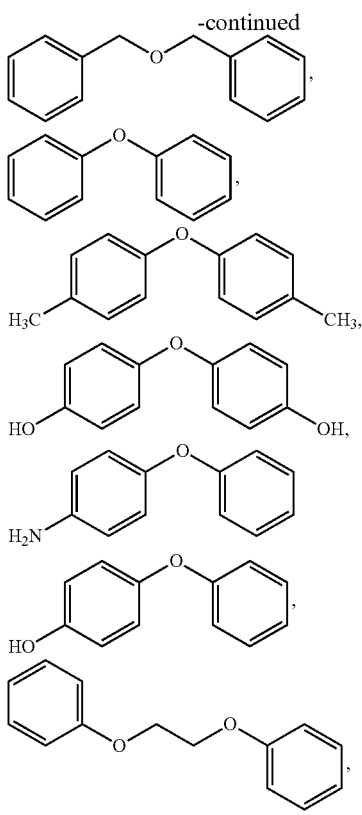

and mixtures thereof.

Suitable crystalline components also include those disclosed in U.S. patent application Ser. No. 13/095,555 to Chopra et al., which is hereby incorporated by reference herein in its entirety. These crystalline materials comprise an ester of an aliphatic linear diacid having the following structure:

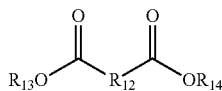

wherein $R_{12}$ may be substituted or unsubstituted alkyl chain and is selected from the group consisting of —$(CH_2)_1$— to —$(CH_2)_{12}$—, and wherein $R_{13}$ and $R_{14}$, each independently of the other, is selected from the group consisting of a substituted or unsubstituted aromatic or heteroaromatic group, substituents including alkyl groups, wherein the alkyl portion can be straight, branched or cyclic.

Suitable crystalline components also include those disclosed in U.S. patent application Ser. No. 13/456,619 to Chopra et al., which is hereby incorporated by reference herein in its entirety. These crystalline materials comprise diurethanes having the following structure:

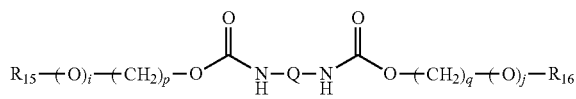

wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4. In certain of such embodiments, each $R_{15}$ and $R_{16}$ is independently phenyl or cyclohexyl optionally substituted with one or more methyl or ethyl. In certain of such embodiments, $R_{15}$ and $R_{16}$ is phenyl. In certain embodiments, Q is —$(CH_2)_n$— and n is 4 to 8. In certain of such embodiments, n is 6. In certain embodiments, each $R_{15}$ and $R_{16}$ is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

Suitable crystalline components also include those disclosed in U.S. patent application Ser. No. 13/457,323 to Morimitsu et al., which is hereby incorporated by reference herein in its entirety. These crystalline component being a sulfone compound having the following structure:

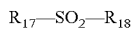

$$R_{17}-SO_2-R_{18}$$

wherein $R_{17}$ and $R_{18}$ can be the same or different, and wherein $R_{17}$ and $R_{18}$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to from about 40 carbon atoms, from about 6 to about 20 carbon atoms, or about 6 to about 10 carbon atoms, although the numbers can be outside of these ranges, and mixtures thereof.

In certain embodiments, each $R_{17}$ and $R_{18}$ is independently alkyl, or aryl, optionally substituted with one or more halo, amino, hydroxy, or cyano groups and combinations thereof, or $R_{17}$ and $R_{18}$ taken together with the S atom to which they are attached form a heterocyclic ring. In certain of such embodiments, each $R_{17}$ and $R_{18}$ is independently an optionally substituted alkyl, such as, methyl, ethyl, isopropyl, n-butyl, or t-butyl. In certain of such embodiments, each $R_6$ and $R_7$ is independently an optionally substituted aryl, such as, phenyl, or benzyl. In certain embodiments, each $R_{17}$ and $R_{18}$ is independently substituted with one or more amino, chloro, fluoro, hydroxy, cyano or combinations thereof. Substitution on the aryl groups may be made in the ortho, meta or para position of the phenyl groups and combinations thereof. In certain embodiments, each $R_{17}$ and $R_{18}$ is independently 2-hydroxyethyl, or cyanomethyl.

In certain embodiments, the crystalline component may include diphenyl sulfone, dimethyl sulfone, bis(4-hydroxyphenyl)sulfone, bis(4-aminophenyl)sulfone, bis(3-aminophenyl)sulfone, bis(4-chlorophenyl)sulfone, bis(4-fluorophenyl)sulfone, 2-hydroxyphenyl-4-hydroxyphenyl sulfone, phenyl-4-chlorophenyl sulfone, phenyl-2-aminophenyl sulfone, bis(3-amino-4-hydroxyphenyl)sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolane, and mixtures thereof.

In embodiments, the crystalline compound may comprise an ester of tartaric acid of the following formula:

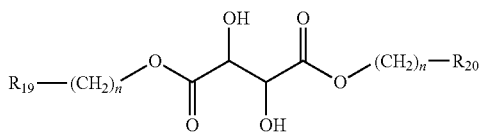

wherein each $R_{19}$ and $R_{20}$ is independently an aryl or a heteroaryl optionally substituted with a lower alkyl and alkoxy, each n is independently 0 to 3. In certain embodiments, each $R_{19}$ and $R_{20}$ is independently an optionally substituted aryl, such as a phenyl. In certain embodiments, each $R_{19}$ and $R_{20}$ is independently not substituted, or substituted with methyl, ethyl, isopropyl, methoxy or ethoxy. In certain embodiments, each $R_{19}$ and $R_{20}$ is independently a phenyl optionally substituted with methyl or methoxy.

In certain embodiments, each $R_{19}$ and $R_{20}$, independently is selected from the group consisting of

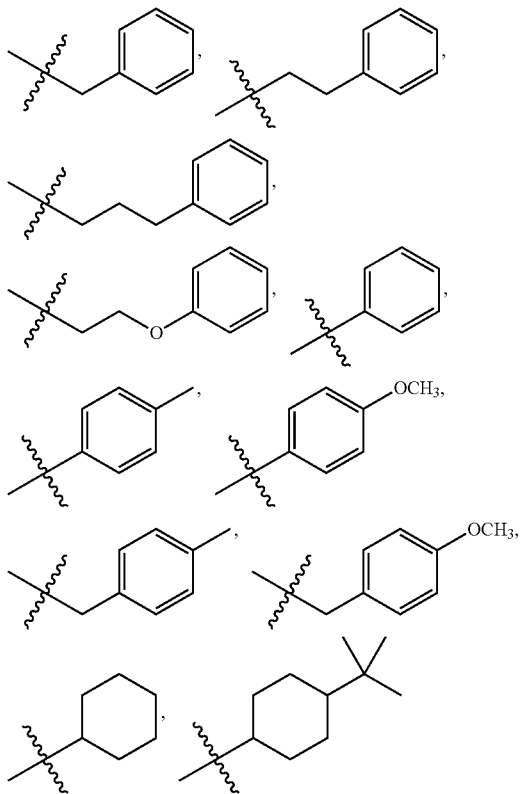

and mixtures thereof.

In certain embodiments, the tartaric acid backbone is selected from L-(+)-tartaric acid, D-(−)-tartaric acid, DL-tartaric acid, or mesotartaric acid, and mixtures thereof.

In certain embodiments, the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, and stereoisomers and mixtures thereof.

In embodiments, the crystalline compound is a compound of the formula

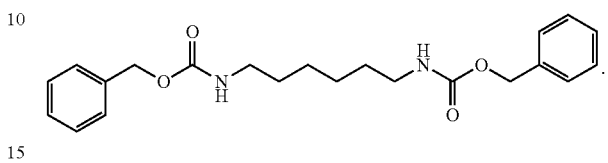

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity (>$10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The $\Delta T$ between $T_{melt}$ and $T_{crys}$ is less than about 55° C.

The crystalline compound can be present in any suitable or desired amount. In embodiments, the crystalline material is present an amount of from about 60 percent to about 95 percent by weight, or from about 65 percent to about 95 percent by weight, or from about 70 percent to about 90 percent by weight of the total weight of the ink composition.

The crystalline and amorphous materials of the present embodiments were found to be miscible with one another and the resulting ink compositions formulated with the crystalline and amorphous materials show good rheological profiles. Image samples created by the phase change ink composition on coated paper by K-proof exhibit excellent robustness. A K-proofer is a common test fixture in a print shop. In this case the proofer has been modified to heat the printing plate to melt the phase change ink. The K-Proofer used has three rectangular gravure patterns each approximately 9.4×4.7 centimeters. The cell density of the first rectangle is nominally 100%, the second 80%, and the third 60%. In practice this K-proof plate results in films (or pixels) of about 5 microns in thickness (or height). Test ink is spread over the heated gravure plate and a test print is made by passing a wiping blade across the plate surface immediately follow by a rubber roll upon which a test paper has been secured. As the paper roll passes ink is transferred from the gravure cells to the paper. Furthermore, using the present crystalline and amorphous materials has additional advantages of being low cost, and from a potentially bio-derived source.

The phase change ink compositions herein comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present tartrate compounds and derivatives thereof, which provide crystalline components for the phase change inks, have been discovered to produce robust inks having desirable rheological profiles and that meet the many requirements for inkjet printing.

The present phase change ink compositions comprise the crystalline and amorphous material in combination with a white colorant as described herein and optionally with a fluorescent dye. The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the resulting ink compositions comprising a blend of the crystalline and amorphous compounds show good rheological profiles and that meet the many requirements for ink jet printing.

Synthesis of Tartaric Acid Esters.

Tartaric acid can be reacted with a variety of alcohols to make di-esters as shown in the synthesis scheme below, which illustrates the preparation of a tartaric acid di-ester compound of the present embodiments. The esterification can be conducted by a one-step reaction:

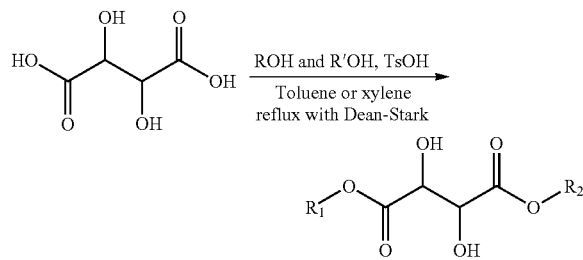

wherein ROH and R'OH may be the same or different.

To synthesize the amorphous materials, a variety of aliphatic alcohols may be used in the esterification such as, for example, menthol, isomenthol, neomenthol, isoneomenthol, and any stereoisomers and mixtures thereof.

In embodiments, menthol is selected as the alcohol. Both tartaric acid and menthol have stereoisomers, therefore there are many possible combinations in terms of chirality. In embodiments, three combinations of tartaric acid and menthol (di-L-menthyl L-tartrate, di-DL-menthyl L-tartrate, di-L-menthyl DL-tartrate) can be synthesized. Surprisingly, all combinations, even in the combination of optically pure L-menthol and L-tartaric acid, made amorphously setting materials. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 16 carbon atoms.

To synthesize the crystalline materials, a variety of aromatic alcohols may be used in the esterification. Non-limiting exemplary aromatic alcohols include the following

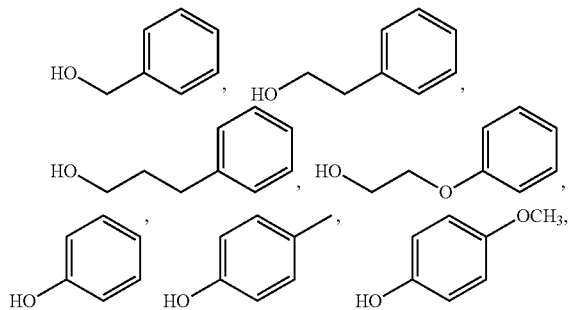

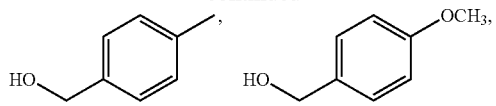

and any stereoisomers and mixtures thereof.

In embodiments, two or more molar equivalents of alcohol may be used in the reaction to produce the di-esters of tartaric acid. If one molar equivalent of alcohol is used, the result is mostly mono-esters.

Synergist.

The phase change ink compositions here in optionally further comprise a synergist. Any suitable or desired synergist can be employed. In embodiments, a copper phthalocyanine derivative is employed as a synergist for improving dispersion stability of pigmented phase change inks.

Dispersant.

The phase change ink compositions herein can contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula

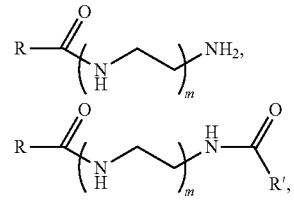

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 32000, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

Other Additives.

The ink may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX® 1098, available from BASF); 2,2-bis(4-(2-(3,5-di-tert-butyl-4-hydroxyhydrocinnamoyloxy))

ethoxyphenyl)propane (TOPANOL-205, available from Vertellus); tris(4-tert-butyl-3-hydroxy-2,6-dimethyl benzyl) isocyanurate (Aldrich); 2,2'-ethylidene bis(4,6-di-tert-butylphenyl)fluoro phosphonite (ETHANOX® 398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethylaminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD® 76, NAUGARD® 445, NAUGARD® 512, and NAUGARD® 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The phase ink compositions of the present disclosure can be prepared by any desired or suitable method. In embodiments, a method for preparing a phase change ink composition herein comprises combining an amorphous compound; a crystalline compound; a white colorant having a volume average particle size of from about 25 nanometers to less than 200 nanometers; an optional fluorescent colorant; an optional synergist; an optional dispersant; to produce a phase change ink composition.

For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet herein contains a phase change ink composition comprising an amorphous compound; a crystalline compound; an optional synergist; an optional dispersant; an optional fluorescent dye; and a white colorant having a volume average particle size of from about 25 nanometers to less than 200 nanometers.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition as described herein; melting the ink composition; and causing droplets of the melted ink to be ejected in an imagewise pattern onto a substrate.

In embodiments, a process herein includes wherein the optional fluorescent dye is present in the phase change ink; and wherein the melted ink is ejected in an imagewise pattern onto a colored substrate to form a printed image on the colored substrate wherein the printed image changes color from white to a different color when seen under ultraviolet light.

In further embodiments, a process herein includes wherein the optional fluorescent dye is present; wherein the melted ink is ejected in an imagewise fashion to form a white background on a substrate; and wherein a printed image is formed by depositing a colored ink onto the white background in an imagewise fashion wherein the background changes color from white to a different color when exposed to ultraviolet light.

In further embodiments, a process herein includes wherein the substrate is selected from the group consisting of dark substrates, in embodiments, dark substrates meaning substrates of colors that are closer to the center on a CMYK Real Color Wheel™, black substrates, brown substrates, cardboard substrates, Kraft paper substrates, and thick paper substrates, in embodiments substrates having the thickness of corrugated cardboard comprising a fluted corrugated sheet and one or two flat linerboards as is known in the art, in embodiments having a flute thickness of from about 0.8 millimeters to about 4.8 millimeters, although not limited.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, in another embodiment, of greater than about $10^5$ centipoise at a temperature of less than about 40° C., in another embodiment, of less than about 15 centipoise at a temperature of no less than about 70° C., although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like. In specific embodiments, the substrate comprises a dark substrate such as brown, black, and the like, such as brown or black Kraft paper. In other embodiments, the substrate comprises a cardboard or thick paper substrate. In embodiments, the substrate is selected from the group consisting of dark substrates, black substrates, brown substrates, cardboard substrates, Kraft paper substrates, and thick paper substrates.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

A white pigmented dispersion was prepared according to the formulation shown in Table 1.

TABLE 1

| Component | Weight Percent | Mass/grams |
|---|---|---|
| Di-DL-menthyl L-tartrate (DMT) | 60 | 24 |
| TiO$_2$ | 20 | 8 |
| Solsperse ® 32000 | 20 | 8 |
| Total | 100 | 40 |

The TiO$_2$ was a 90 nanometer particle size (Dynamic Light Scattering, DLS) TiO$_2$ obtained from Sigma Aldrich®.

Solsperse® 32000 is a polymeric dispersant available from The Lubrizol Corporation.

Di-DL-menthyl L-tartrate (DMT) is an amorphous compound described hereinabove. For further detail, see U.S. patent application Ser. No. 13/095,784.

The white pigment dispersion was prepared as follows. The Solsperse® 32000 and DMT was weighed into a beaker and stirred at 140° C. for 30 minutes in a heating block. The TiO$_2$ pigment was weighed on an analytical balanced in a plastic pan and slowly added to the mixture so that the pigment did not clump. The mixture was stirred an additional 2 hours at 140° C. to ensure the pigment was properly wetted and then the stir bar was removed. The mixture was homogenized at 13000 RPM for 20 minutes in a Polytron® Homogenizer, available from Metrohm USA, Inc. and then transferred to a Szegvari 01 attritor (Union Process) that was also heated to 110° C., and charged with 1,800 grams 440 C type ⅛ inch diameter stainless steel balls available from Hoover Precision Products. The pigment dispersion was allowed to attrite at 300 RPM for 24 hours upon which time the final attrited mixture was isolated from the stainless steel balls and filtered with a 5 micron stainless steel mesh using a KST-47 filtration apparatus, commercially available from Advantec MFS. Inc.

Example 2

A white phase change ink was prepared using the white pigment concentrate of Example 1 in accordance with the formulation shown in Table 2.

TABLE 2

| Component | Weight Percent | Mass/grams |
|---|---|---|
| Diphenethyl L-tartrate (DPT) | 70.59 | 67.2 |
| TiO$_2$ Pigment Concentrate of Example 1 | 29.41 | 28 |
| Total | 100 | 95.2 |

The white pigmented phase change ink was prepared as follows. The pigment dispersion was placed in a beaker and the beaker containing the pigment dispersion was heated in an 80° C. oven for 30 minutes. The beaker was removed from the oven and allowed to cool to room temperature. The DPT was added to the pigment dispersion in the beaker at room temperature. The beaker was covered with aluminum foil and the mixture in the covered beaker was then placed in a 140° C. oven for 1 hour. The mixture was then homogenized at 15000 RPM at 140° C. for 30 minutes in a Polytron® Homogenizer, available from Metrohm USA, Inc. The homogenized mixture was then poured into a hot 1 micrometer stainless filtration apparatus and filter under N$_2$ pressure of 5 psi into a final vessel and cooled to room temperature.

FIG. 1 shows a viscosity-temperature profile of the ink of Example 2. FIG. 1 shows that the ink is jettable at 120 C and above (≥10 centipoise).

The ink of Example 2 was printed onto Mylar® stretched polyethylene terephthalate (PET) plastic films (available from DuPont Teijin Films™) using a Xerox® Phaser® printer. The prints were photographed over a dark background to simulate a cardboard substrate.

The ink of Example 2 was also printed directly onto cardboard stock using a Xerox® Phaser® printer. Barcodes, text, and graphic images were demonstrated.

Figure 2:
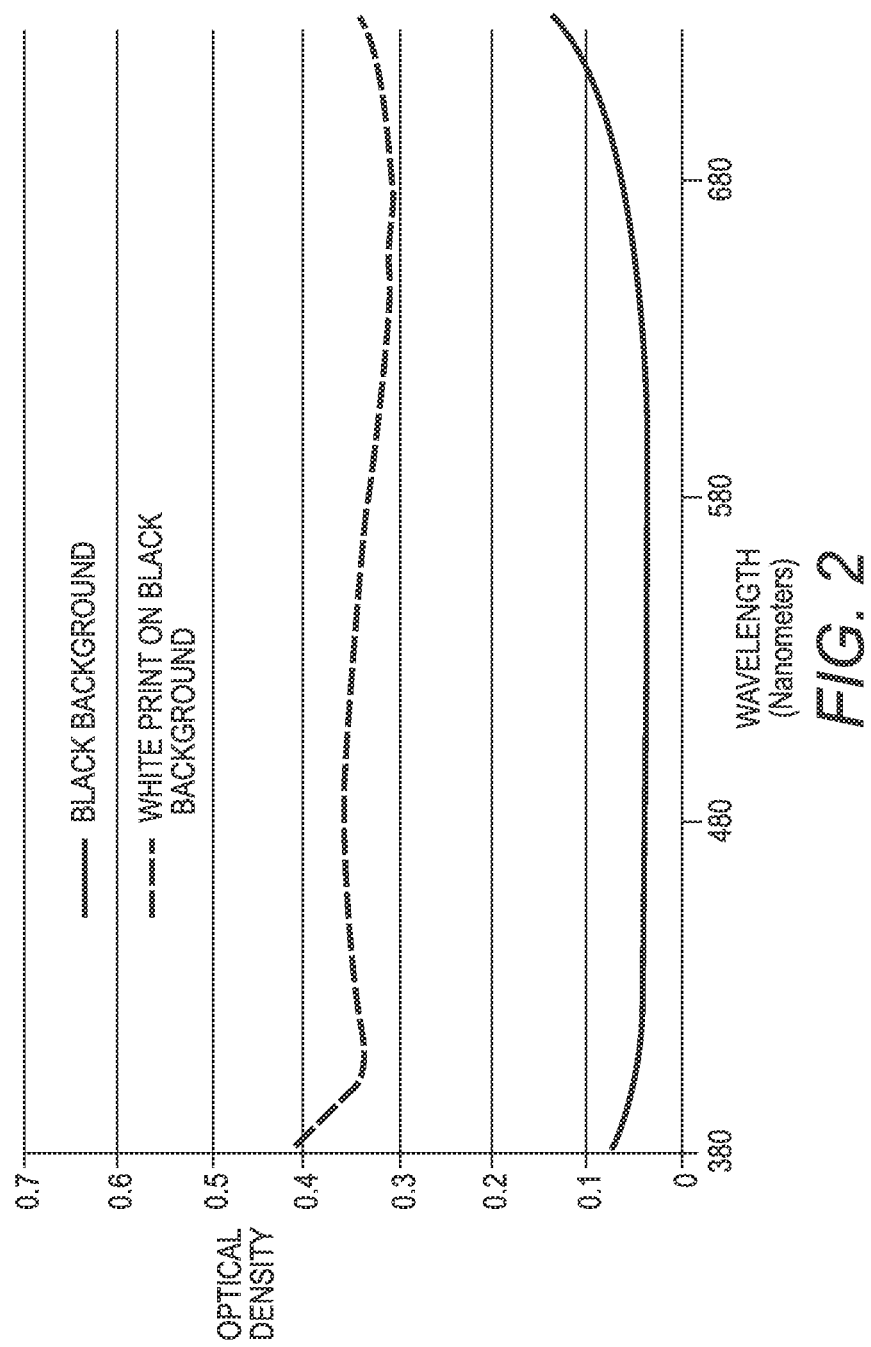
FIG. 2 is a graph showing reflectance spectroscopy measured with a GretagMacbeth Spectrolino of print on a transparent plastic sheet prepared with a phase change ink in accordance with the present disclosure.

A sample of the ink of Example 2 that was printed onto Mylar® stretched PET film was placed on a black cardboard substrate and measured for reflectance to determine the hiding power of the ink. FIG. 2 shows the reflectance spectra measured using a GretagMacbeth Spectrolino™ Spectrophotometer for the black cardboard alone (bottom line) and for the white print on the transparent Mylar® stretched PET film that was placed on the black cardboard substrate (top line). Referring to FIG. 2, optical density is shown for a white print over the black cardboard substrate (dotted line) and for the black cardboard substrate (solid line) over a wavelength of about 380 to about 680 nanometers. The difference in the optical density between the black substrate and the white ink printed on the transparent Mylar® stretched PET film provides the measure of the hiding power of the white ink:

$\Delta OD = 1.41 - 0.47 = 0.94$

This translates into a contrast ratio CR of 8.7. A contrast ratio higher than 5 is considered to provide acceptable readability of printed matter.

Example 3

A white phase change ink having fluorescent properties is prepared as follows. 10 grams of white ink prepared as in Example 2 and 0.2 grams of invisible red fluorescent dye DFKY-C7 (commercially available from Risk Reactor) are placed into a beaker and heated to 130° C. while stirring, for two hours. After cooling to room temperature, the ink solidifies as a white composition. The ink is K-proofed with a commercial K-proofing system (RK Print Coat Instruments Ltd., UK) by melting the ink and transferring onto black paper substrate. When viewed in room light the print is white. When viewed with UV light (365 nanometers) the print appears red due to fluorescence emission of the fluorescent dye additive.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
an amorphous compound;
a crystalline compound;
an optional synergist;
an optional dispersant;
and a white colorant having a volume average particle size of from about 25 nanometers to less than 200 nanometers;
wherein the amorphous compound comprises a first ester of tartaric acid of the formula

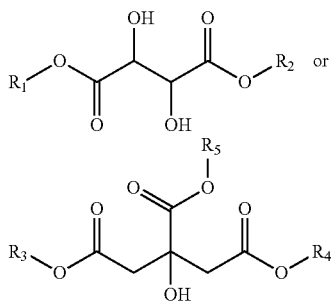

wherein each of $R_1, R_2, R_3, R_4$, and R5 is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and
wherein the crystalline compound comprises a second ester of tartaric acid of the formula

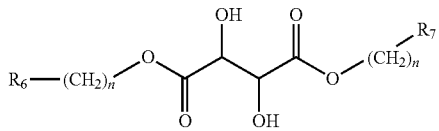

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3, or wherein the crystalline compound is a compound of the formula

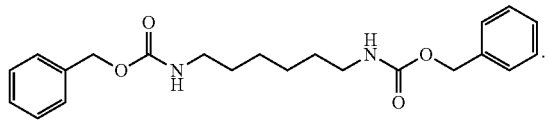 [SMILES: O=C(NCCCCCCNC(=O)OCc1ccccc1)OCc1ccccc1]

2. The phase change ink of claim 1, wherein the white colorant has a volume average particle size of from about 25 to about 100 nanometers.

3. The phase change ink of claim 1, wherein the white colorant is a selected from the group consisting of titanium dioxide pigment, rutile, zinc oxide pigment, zinc sulfide pigment, calcium carbonate pigment, clay, lithopone, and mixtures and combinations thereof.

4. The phase change ink of claim 1, wherein the white colorant is a titanium dioxide pigment having a volume average particle size of from about 25 to about 100 nanometers.

5. The phase change ink of claim 1, wherein the white colorant is present in the phase change ink in an amount of from about 1 to about 60 weight percent based on the total weight of the ink.

6. The phase change ink of claim 1, further comprising:
a fluorescent dye.

7. The phase change ink of claim 6, wherein the fluorescent dye is selected from the group consisting of rhodamines, fluorescein, coumarins, napthalimides, benzoxanthenes, acridines, azos; and oil and solvent based dyes selected from the group consisting of DFSB class, DFPD class, and DFSB-K class; and mixtures and combinations thereof.

8. The phase change ink of claim 1, wherein the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis-4-methylphenyl) L-tartrate, bis(4-methoxylphenyl) L-tartrate, bis(4-methylbenzyl) L-tartrate, bis(4-methoxybenzyl) L-tartrate, and stereoisomers and mixtures thereof.

9. The phase change ink of claim 1, wherein the amorphous compound is selected from the group consisting of bis(2-isopropyl-5-methylcyclohexyl) L-tartrate, (4-t-butylcyclohexyl)(cyclohexyl)-L-tartrate, stereoisomers and mixtures thereof.

10. The phase change ink of claim 1, wherein the amorphous compound is a compound of the formula

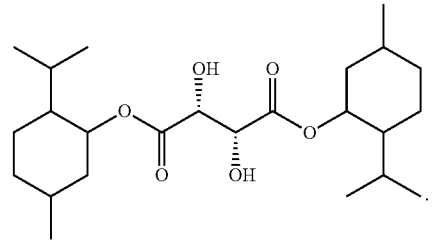 [SMILES: CC1CCC(C(C)C)C(OC(=O)[C@H](O)[C@@H](O)C(=O)OC2CC(C)CCC2C(C)C)C1]

11. The phase change ink of claim 1, wherein the dispersant a compound of the formula

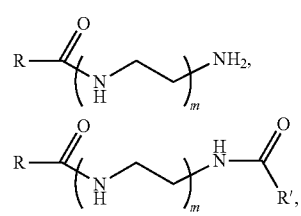

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

12. A method for preparing a phase change ink composition comprising:
combining an amorphous compound; a crystalline compound; an optional synergist; an optional dispersant; and a white colorant having a volume average particle size of from about 25 nanometers to less than 200 nanometers, with optional stifling, optional homogenizing, and optional heating, to provide a phase change ink composition;
wherein the amorphous compound comprises a first ester of tartaric acid of the formula

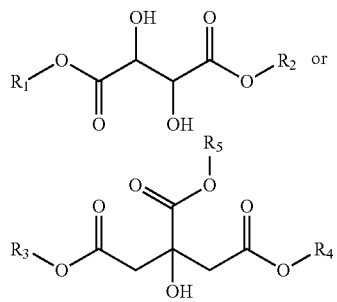

wherein each of $R_1$, $R_2$, $R_3$, $R_4$, and R5 is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and
wherein the crystalline compound comprises a second ester of tartaric acid of the formula

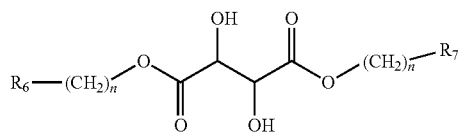

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3, or wherein the crystalline compound is a compound of the formula

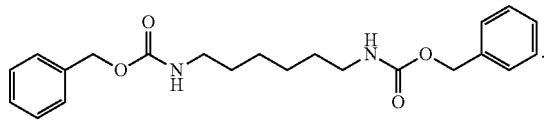 [SMILES: O=C(NCCCCCCNC(=O)OCc1ccccc1)OCc1ccccc1]

13. A process comprising:
(1) incorporating into an ink jet printing apparatus a phase change ink composition comprising an amorphous compound; a crystalline compound; an optional synergist; an optional dispersant; an optional fluorescent dye; and a white colorant having a volume average particle size of from about 25 nanometers to less than 200 nanometers;
wherein the amorphous compound comprises a first ester of tartaric acid of the formula

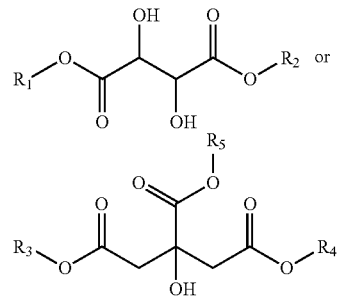

wherein each of $R_1$, $R_2$, $R_3$, $R_4$, and R5 is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and
wherein the crystalline compound comprises a second ester of tartaric acid of the formula

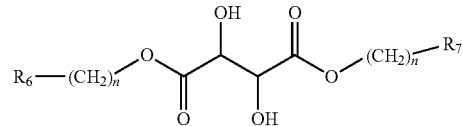

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3, or wherein the crystalline compound is a compound of the formula

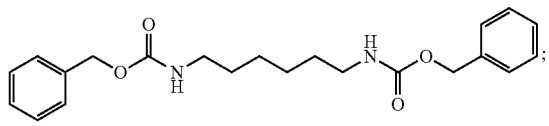 [SMILES: O=C(NCCCCCCNC(=O)OCc1ccccc1)OCc1ccccc1]

(2) melting the ink; and
(3) causing droplets of the melted ink to be ejected in an imagewise pattern onto a substrate.

14. The process of claim 13, wherein the optional fluorescent dye is present; and
wherein the melted ink is ejected in an imagewise pattern onto a colored substrate to form a printed image on the colored substrate wherein the printed image changes color from white to a different color when seen under ultraviolet light.

15. The process of claim 13, wherein the optional fluorescent dye is present;
wherein the melted ink is ejected in an imagewise fashion to form a white background on a substrate;
wherein a printed image is formed by depositing a colored ink onto the white background in an imagewise fashion wherein the background changes color from white to a different color when exposed to ultraviolet light.

16. The process of claim 13, wherein the substrate is selected from the group consisting of dark substrates, black substrates, brown substrates, cardboard substrates, a Kraft paper substrates, and thick paper substrates.

17. A coated substrate comprising:
a substrate and a phase change ink composition deposited thereover;
wherein the phase change ink composition comprises an amorphous compound; a crystalline compound; an optional synergist; an optional dispersant; an optional fluorescent dye; and a white colorant having a volume average particle size of from about 25 nanometers to less than 200 nanometers
wherein the amorphous compound comprises a first ester of tartaric acid of the formula

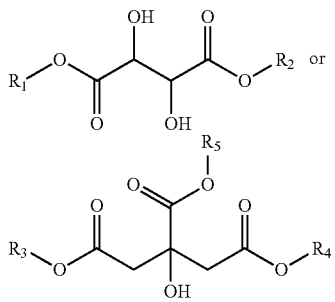

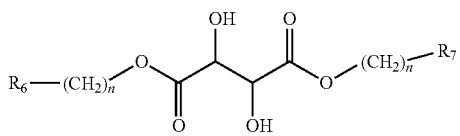

wherein each of $R_1$, $R_2$, $R_3$, $R_4$, and R5 is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and
wherein the crystalline compound comprises a second ester of tartaric acid of the formula

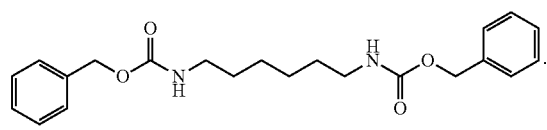 [SMILES: O=C(NCCCCCCNC(=O)OCc1ccccc1)OCc1ccccc1]

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3, or wherein the crystalline compound is a compound of the formula 18. An ink jet printer stick or pellet containing a phase change ink composition comprising an amorphous compound; a crystalline compound; an optional synergist; an optional dispersant; an optional fluorescent dye; and a white colorant having a volume average particle size of from about 25 nanometers to less than 200 nanometers
wherein the amorphous compound comprises a first ester of tartaric acid of the formula

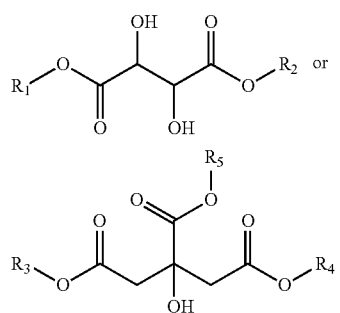

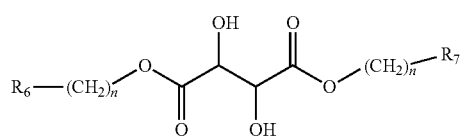

wherein each of $R_1$, $R_2$, $R_3$, $R_4$, and R5 is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and
wherein the crystalline compound comprises a second ester of tartaric acid of the formula

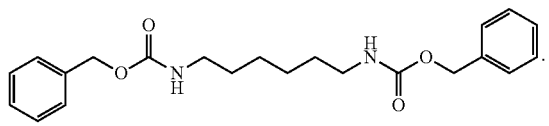 [SMILES: O=C(NCCCCCCNC(=O)OCc1ccccc1)OCc1ccccc1]

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3, or wherein the crystalline compound is a compound of the formula

* * * * *